United States Patent

Visschedijk

[15] 3,696,345

[45] Oct. 3, 1972

[54] MAGNETIC CORE STORAGE MATRICES

[72] Inventor: Gerhardus Bernardus Visschedijk, 123 Achterholkse Malenweg, Hengelo, Overijsel, Netherlands

[22] Filed: Feb. 2, 1970

[21] Appl. No.: 7,336

Related U.S. Application Data

[63] Continuation of Ser. No. 404,294, Oct. 16, 1964, abandoned.

[30] Foreign Application Priority Data

Oct. 18, 1963 Netherlands...............299,494

[52] U.S. Cl..340/174 MA, 340/174 SP, 340/174 PM

[51] Int. Cl.............................G11c 5/04, G11c 17/00

[58] Field of Search.....340/174; 336/110; 235/61.12

[56] References Cited

UNITED STATES PATENTS

| | | | |
|---|---|---|---|
| 3,566,373 | 2/1971 | Shackell | 340/174 SP |
| 3,181,128 | 4/1965 | Peck et al | 340/174 M |
| 3,501,755 | 3/1970 | Winn | 340/174 SP |
| 3,058,097 | 10/1962 | Poland | 340/174 |
| 3,258,726 | 6/1966 | Hellmann | 340/174 X |
| 3,488,647 | 1/1970 | Stuckert | 340/174 |
| 3,100,834 | 8/1963 | Demer | 235/61.12 |
| 3,366,940 | 1/1968 | Viehe | 340/174 |

OTHER PUBLICATIONS

RCA Technical Notes, " Mounting for Magnetic Memory Cores" by Schlenker RCATN No.: 190.

*Primary Examiner*—Stanley M. Urynowicz, Jr.
*Attorney*—Frank R. Trifari

[57] ABSTRACT

A magnetic core storage matrix comprises a rigid support plate of magnetic material that supports a layer of flexible plastic material impregnated with fine iron powder and containing recesses in the form of a matrix. A plurality of magnetic storage cores are mounted in the recesses. Information is recorded in the storage matrix by applying saturating magnetic fields to selected ones of the cores.

7 Claims, 4 Drawing Figures

INVENTOR.
GERHARDUS B. VISSCHEDIJK
BY
Frank R. Trifari
AGENT

INVENTOR
GERHARDUS B. VISSCHEDIJK
BY
Frank R. Trifari
AGENT

MAGNETIC CORE STORAGE MATRICES

This application is a continuation of application Ser. No. 404,294, filed Oct. 16, 1964, which is now abandoned.

This invention relates to a magnetic core storage matrix, and more particularly to matrices having cores which can be made substantially inoperative by inducing a strong magnetic field therein, the location of each core in the matrix being determined by the supporting means for the cores.

In Belgian Patent specification No. 627,326, a matrix is described in which preselected cores are made inoperative as storage means by placing small magnets in their immediate vicinity. These small magnets induce such a strong field in the cores that the driving currents in the wiring of the matrix are unable to produce more than a very small change of flux in these cores. Consequently, when these inoperative cores are read out, they will induce at most voltage pulses of a smaller magnitude in the corresponding read wires than the magnitude of voltage pulses induced in the read out circuit by operative cores. The read out circuit is arranged to react only to pulses received from the operative cores.

The magnetic reluctance for the flux generated by the magnets is reduced by a system having a high magnetic permeability. This system is extended in the immediate vicinity of the cores along the matrix at the side away from the magnets, and in this case it comprises a soft iron plate. In this known matrix the magnets used for making cores inoperative are supported in openings in a plate. It is, necessary, therefore, for each core to be situated opposite such an opening in order that there will be a path having low magnetic reluctance between a magnet inserted in such an opening and the corresponding core situated near that opening. For this reason, in the matrix described in said Belgian Patent specification No. 627,326, the cores are glued into openings of a second plate. This method has various disadvantages. In a direction perpendicular to the plate, the ring shaped cores used in said matrix will not be in corresponding positions, one of the reasons thereof being that the amount of glue between a core and the plate will not be the same for all cores. Consequently, it is impossible to provide air gaps of equal length between the cores and the system having a high magnetic permeability. If the magnets are not locked by common locking means at the side away from the cores, the position of the magnets with respect to the cores will not give rise to difficulties, but in this case it must be accepted that the reluctance for the magnetic flux at the side of the magnets away from the cores will be relatively high. For this reason the magnets are preferably locked behind a soft iron plate, but in this case the fixed but not completely equal positions of the cores together with the small but unavoidable differences in the dimensions of the magnets will cause difficulties. In order to prevent the locked magnets from damaging certain cores as a result of the forces exerted by these magnets on said cores ample space for the magnets is required between the core and the soft iron plate. This space gives rise to the presence of undesirable and relatively large air gaps situated between the majority of the magnets and the soft iron locking plate on the one hand, and the cores on the other hand.

It is therefore an object of the present invention to provide an improved magnetic core storage matrix which mitigates one or more of the above disadvantages. We therefore provide a magnetic core storage matrix in which the cores are supported in recesses in a resilient supporting layer. The resilient layer is supported, at the side away from the recesses, by a rigid supporting system so that a thin layer of resilient material is maintained between a core in a recess and the rigid system. In a matrix built in this way the cores can be pressed backwards by the elements, such as the small magnets described in the Belgian Patent specification No. 627,326 mentioned above, so that, on the one hand, damage to the cores caused by the elements adjacent to the cores is prevented, and on the other hand, the length of the air gaps in the magnetic circuits for the flux for making cores inoperative is insignificant. Also, in a matrix according to the invention, it is preferable to provide a system having high magnetic permeability extending along the matrix in the immediate vicinity of the cores and located at a side of the matrix away from the elements carrying flux to the inoperative cores. This system provides a return path for said flux. For this purpose the rigid supporting system may include a soft iron plate used as a system having high magnetic permeability. The said system may also consist of soft iron wires or strips embedded in the resilient supporting layer, or of a thin soft iron plate situated between the rigid supporting system and the supporting layer.

In a very effective embodiment of the invention the supporting layer consists of resilient material loaded with fine iron powder or fine powder of an iron compound having high magnetic permeability. In this way the magnetic reluctance of the return path is decreased for the flux passing through inoperative cores. The application of a resilient layer loaded with iron powder or iron compound powder is especially important in a matrix provided with a system having high magnetic permeability, as described above, for in this case the very thin elastic layer between the cores and the system constitutes the only magnetic reluctance worth mentioning in the complete magnetic circuit. Therefore, it is important that this magnetic reluctance be as low as possible. It is possible to attain a reduction to one-fourth, or less, of the value for air.

In order to exactly fix the positions of the cores in the recesses, thereby determining their location in the matrix, in one very effective embodiment of the invention, the parts of the cores which extend beyond the recesses are located for at least the greater part in openings in a covering plate or layer which extends along the supporting layer. In this embodiment the wiring of the matrix is located between the covering plate or layer and the supporting layer provided with recesses. The construction described above is not only important in matrices in which the cores are made inoperative by separate magnets, but also, and especially, in embodiments of matrices in which the magnetic fields for making cores inoperative are supplied by magnets or magnet systems which are common to a relatively large number of cores.

The invention will now be described, by way of example, with reference to the accompanying drawings, in which.

Figure 1:
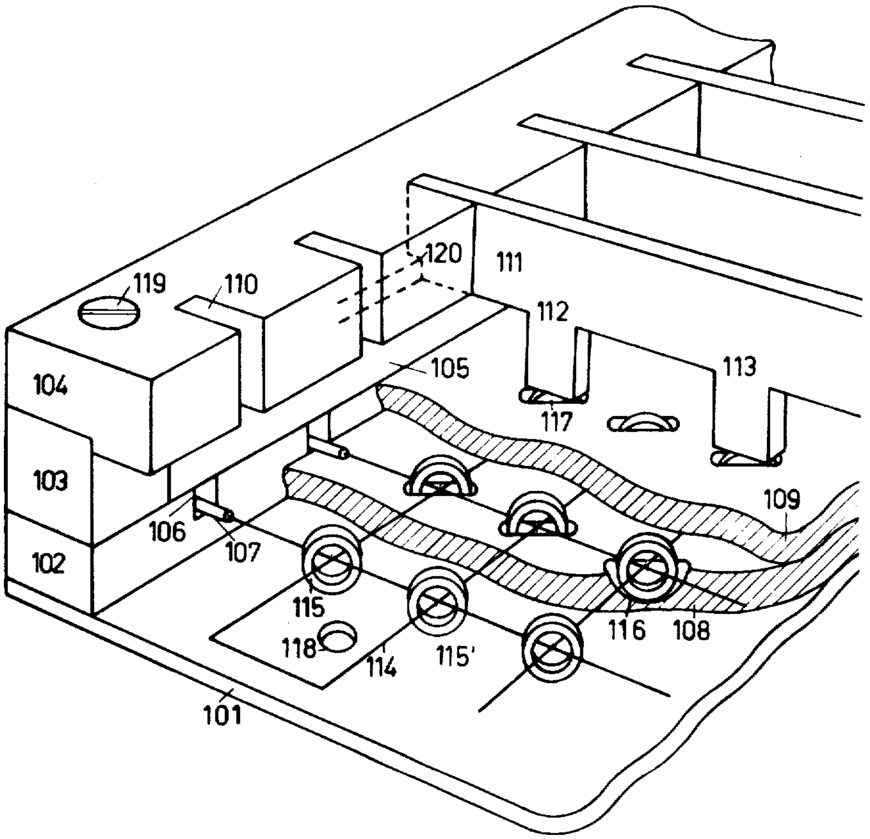
FIG. 1 shows in perspective a small part of a matrix according to the invention in which the fields for making cores inoperative are supplied by magnets which are common to a number of cores.

FIG. 1 shows a small part of a matrix according to the invention. It is assumed that this matrix has 64 rows and 4,096 cores. The complete matrix is supported by a soft iron frame-plate 101 which constitutes a system having high magnetic permeability. This plate carries, adjacent to each of two opposite edges thereof, a soft iron bar 102, only one bar 102 being shown in FIG. 1. Furthermore, FIG. 1 shows only nine of the 4,096 cores, one of which is designated by the reference numeral 115. The rows of cores are arranged at right angles to the bars 102. Selection lines, such as wire 107, are passed through all the cores of a row and leave the matrix through slots 106 in the bars 102. The cores are also arranged in columns in the well known way, so that all of the cores in a column are situated on a line which is parallel to the bars 102. Reading wires, such as 114, pass through all the cores of a column. A resilient plastic layer 108, shown in cut-away section, rests on the bottom plate 101. Silicone rubber, to which is added fine iron powder or fine powder of an iron compound is a very suitable material for making this layer. The term "resilient" refers to the capability of a body to return to or resume the original position or shape and is not intended to include substances such as cardboard or the like. The layer is maintained in a fixed position with respect to the matrix by means of projections on its lower side which enter openings 118 in the bottom plate 101. The layer 108 is provided with recesses 116 for locating the cores 115 so that each of the latter rests on a thin layer of the resilient material. A layer 109 entirely covers the wires 107 and 114 and consists of a flexible plastic such as silicone rubber. The layer 109 is provided with a pattern of openings 117 through which the cores protrude. The pattern of openings 117 correspond to the pattern of recesses in the layer 108. The layer 109 is thinner than the layer 108 and the openings 117 are such as to provide a snug fit for each of the cores 115. This layer also is shown in cut-away section so that the location of some of the cores and a part of the wiring is visible. Mounted on each end of each bar 102 is a brass block 103. A moulded soft iron bar 104 of high magnetic permeability is mounted on the two brass blocks belonging to the same bar 102. The bar 104, the brass blocks 103 and the bar 102 are fixed to the bottom plate 101 by means of brass screws 119. A bar 105 consisting of magnetic material with a high coercive force is mounted between the bar 102 and the moulded bar 104. This bar 105 is magnetized in a direction transverse to its length and to the plane in which the bottom plate 101 lies. The bar 104 possesses slots 110, above and in alignment with each of the rows of cores. The inner part of the slots are located above the magnetized bar 105. A structure (not shown) similar to that formed by the bars 102, 104 and 105 and brass blocks 103 is mounted on the matrix opposite to and parallel with the aforementioned bars and blocks. Oppositely facing bars 104 are mounted so that the slots therein are in alignment with each other and with the rows of cores, so that a straight notched bar 111 can be inserted into two oppositely located slots. At each end of the notched bar 111 there is a cut-away portion 120 which allows the bar 111 to rest on the edge of the magnetized bar 105 and thereby prevents lengthwise movement of the bar in the slots and limits its movement towards the cores. The slots thus define the position of the notched bar in the matrix and the cut-away portions 120 allow the ends of the teeth of the bar to rest against, or to be situated in the immediate vicinity of, the cores protruding from the covering layer 109. By limiting the movement of the bar 111 towards the cores, the latter are prevented from being damaged. The bar 111 is provided with teeth spaced apart by a distance corresponding to the distance between successive cores in a row. Teeth which would be adjacent cores that are to remain operative are removed from the bar 111 by means of a tweezing implement or a punch leaving teeth 112 and 113 which, on insertion of the bar 111, cause the cores adjacent thereto to be inoperative. Magnetic flux from the magnet 105 thus flows through the bar 104, the notched bar 111, the teeth 112 and 113, the cores 115 in the openings 117, the iron powder in the thin layer of plastic below the cores, the soft iron bottom plate 101 and the soft iron bar 102 back to the magnet 105. In this magnetic circuit the permanent magnet can maintain a high induction in the cores because the air gaps in this circuit are short. As a rule a tooth such as 112, will rest on the core without damage thereto since the latter slightly compresses the elastic material of the layer 108 situated between the core and the plate 101. Moreover, depression of the notched bar is limited by the recesses 120 engaging the corner of the magnet 105. Consequently, at the point where the magnetic field passes from a tooth to a core the reluctance is low, and when the field passes from the core to the bottom plate 101, it also experiences a low reluctance because the thickness of the layer 108 is very small and it contains iron powder.

Figure 2:
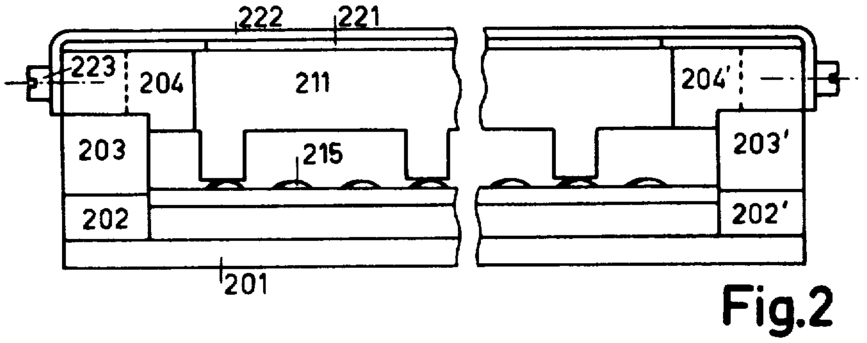
FIG. 2 shows a front view of the matrix shown in FIG. 1.

FIG. 2 shows a front elevation of the matrix represented in FIG. 1. Corresponding parts are designated in FIG. 1 and FIG. 2 by reference numerals having the same last two figures. FIG. 2 shows how the notched bars 211 are supported in slots of the moulded bars 204 and 204', each of the latter being located near one edge of the matrix. The bars 211 are retained in their slots by a lid 222 having turned-down edge portions which are secured to the bars 204 and 204' by means of screws 223 passing through slots 224. A layer 221 of resilient material, for example, foam plastic, is situated between the lid 222 and the bars 211 to prevent the latter from exerting a force on the cores sufficient to damage them.

It is obvious that the application of the invention does not depend on the way in which information is written into or read-out of the matrix, or on the way in which a row in the matrix is selected, or the way in which the matrix is wired. The type of matrix described is especially suitable for matrices with two cores per bit because in such matrices half of the cores are always made inoperative so that it is easy to adapt the magnets supplying the flux to the total amount of flux required by a certain matrix. The construction described can, however, also be used in matrices with one core per bit. In this case, if the number of inoperative cores is small, it maybe necessary to provide adjustable magnetic shunts which permit the diversion of that part of the flux which is not needed by the matrix.

Figure 4:
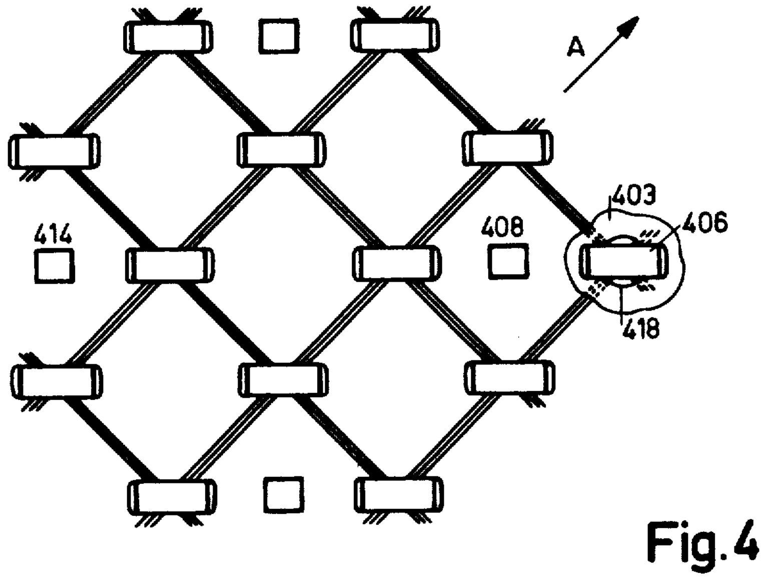
FIGS. 3 and 4 show a cross section and a top view of a matrix according to the invention in which the cores are made inoperative by separate magnets.
Figure 3:
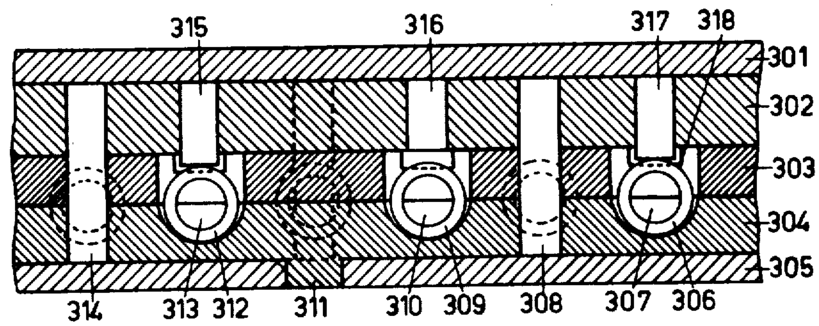

FIGS. 3 and 4 show a matrix according to the invention in which the cores are made inoperative by separate magnets. FIG. 3 shows a cross-section of such a matrix along a line which makes an angle of 45° with the direction of the reading and writing wires as well as with the edges of the matrix. Consequently the cores, such as 306, 309, 312, which are situated in the plane of the drawing, are shown in circular shape. Moreover, a few cores which are situated beyond the plane of the drawing are shown in dotted lines. Part 305 is a soft iron frame plate which in this matrix also constitutes a system having a high magnetic permeability which extends along the matrix in the vicinity of the cores and provides a return path for the flux used to make cores inoperative. A supporting layer 304 consisting of resilient plastics material rests against this frame plate. Recesses, such as 307, 310 and, are present in said supporting layer, and ring shaped cores 306, 309 and 312 are situated in said recesses. The supporting layer is provided with projections, such as 311, which fit snugly into openings of the frame plate 305 so that the position of the supporting layer 304 with respect to the frame plate 305, and the positions of the cores in the recesses with respect to the matrix, are exactly defined. The wiring of the cores in this figure is situated between the supporting layer 304 and a covering layer 303 consisting of plastics material. Layer 303 is provided with a pattern of openings which corresponds to the pattern of recesses in the supporting layer 304. The covering layer 303 is located with respect to the supporting layer so that all of the cores located in recesses in the supporting layer 304 project into openings of the covering layer 303. The plastics material of the supporting layer 304 contains fine iron powder or powder of an iron compound having a high magnetic permeability so that the thin layer of resilient material between a core and the soft iron frame plate 305 has a low magnetic reluctance.

A rigid plate 302 consisting of a non-ferromagnetic material, such as plastics material or pertinax, extends along the side of the covering layer 303 away from the supporting layer 304. Near the edges of the matrix this plate is mounted to the frame plate by means of small bolts and spacer tubes so that the relative position of the two plates is exactly defined. The plate 302 has a pattern of openings which corresponds to the pattern of recesses in the supporting layer 304. When the plate 302 is mounted by means of the small bolts mentioned above to the frame plate 305, the openings are situated in front of the cores located in the recesses in the supporting layer 304. The small magnets used for making cores inoperative fit snugly into the openings 316 in the plate 302. Two of these magnets 315 and 317 are shown in their openings. These magnets are locked under a soft iron locking plate 301 which is mounted to the plate 302 by means of small screws. Consequently the magnets are locked in the matrix. The location of the plate 302 mounted in the way described above is adapted in such a way to the dimensions of the magnets and the location of the cores that, when the soft iron plate 301 is screwed onto and rests against the plate 302, the magnets 315 and 317 press against the cores 312 and 306. This is possible because the cores can slightly compress the resilient material constituting the bottom of the recesses between said ring cores and the frame plate 305. In this way air gaps between the magnets and the plate 301, and between the magnets and the cores, are avoided. In the few cases in which air gaps are unavoidable, they are kept as small as possible.

In the embodiments described, the plate 302 rests against the covering layer 303 without exerting any forces on this layer. In this way the covering layer and the supporting layer are enclosed in an effective manner in a direction transverse to the matrix. Nevertheless, the resiliencey of the supporting layer remains available for permitting the displacements of the ring cores. In the embodiment shown in the figures, the thickness of the covering layer is such that the ring shaped cores remain below the surface of the covering layer that rests against the plate 302. It is therefore necessary that one end of the magnets enter the openings in the covering layer. In many cases, however, the dimensions of the magnets are larger than those of the cores so that openings adapted to receive the cores would be too small for the magnets to enter. In connection therewith, each opening in the covering layer in the matrix represented in FIG. 3 shows, at the side which rests against the plate 302, a cylindrical part with larger dimensions designated by the reference numeral 318. This part is large enough for the magnets to enter and reach the core in the opening. In FIG. 4, near the core 406, the top view 418 of a part of an opening with larger dimensions is shown in the small part of the matrix in which the covering layer 403 has not been removed. In another embodiment the covering layer is thinner so that the cores protrude from the openings in this layer. Also in this embodiment the plate 302 preferably rests against the covering layer. For this reason, at the side where the plate rests against the covering layer, each opening in the plate for supporting a magnet shows a part having larger dimensions into which a core may enter. Finally, if the covering layer is so thin that parts of the cores protrude from the opening, the magnet support plate 302 can be located a short distance from the covering layer so that sufficient space for magnets and cores is available without further measures. In order to provide a suitable return path for the magnetic field supplied by the various magnets, the matrix is also equipped with soft iron rods 308 and 314. These soft iron rods are located at various places in the spaces between the cores. They pass through openings in the layers 303 and 304 and in the plate 302. The length of the rods is chosen so that they fit exactly between the plates 301 and 305 when the plate 301 is mounted to the plate 302. It is not necessary for such bars to be present in all intermediary spaces between cores, provided that a bar is available near enough to each of the cores to constitute a return path for the flux passing through said core. Because the bars pass through openings in the plate 302 and in the layers 303 and 304, the relative positions of plate and layers are exactly and correctly defined. In this relative position the magnets inserted into the openings in the plate 302 will establish contact with the cores near the symmetry axes of these cores in the direction towards the magnets. FIG. 4 shows a top view of the same matrix in which the plates 301 and 302 and the larger part of the covering layer 303 are removed.

The figure shows the location of the cores in the recesses of the supporting layer 304, the location of the soft iron rods 408 and 414, and a part of the wiring of the matrix. The arrow A shows the direction of one of the edges of the matrix. It is obvious that the supporting layer 304 exactly defines the location of the cores in the matrix so that a magnet inserted in an opening of the plate 302 will at any rate be located above the center of a ring core. Moreover, because of its resiliency, this layer permits a core to move backwards under the influence of the forces exerted on it by one of the magnets. This permits the air gaps in the magnetic circuit for such a magnet to be kept as small as possible. Moreover, the fine iron powder in the supporting layer 304 still further reduces the magnetic reluctance of the remaining part of the magnetic circuit. When the locking plate 301 is removed the magnets will scarcely protrude from the plate 302 at the side away from the cores. Nevertheless, in case of a program change, it is still easy to remove these magnets from the plate 302. In order to remove such a magnet a soft iron rod is brought into contact with the outer pole of the magnet. The magnet attracts this rod with a force larger than that with which it attracts the core and consequently follows the rod when it is removed. Should it be desired to remove the magnets by mechanical means, such as pincers, then a thinner plate 302 is used from which the magnets will slightly protrude. In this construction, spacer rings must be mounted between the locking plate 301 and the plate 302, or at any rate the plate 301 must be mounted to the plate 302 so that sufficient space for the free ends of the magnets is available. It is obvious that the application of the supporting layer and of the covering layer according to the invention is not restricted to the types of matrix described. The importance of this application does not depend on the way in which the magnetic fields for making cores inoperative are generated and supplied.

It is not necessary for the resilient material of the supporting layer to contain iron powder. If it does not contain iron powder its resiliency will be still greater so that the layer of resilient material between the cores and the system having a high magnetic permeability can be thinner. The application of iron powder is, however, preferable, because the lines of force can then be distributed over a larger space. Because the dimensions of the recesses in the supporting layer and the openings in the covering layer are preferably matched to the dimensions of the cores so that the cores fit snugly into these recesses and openings, it will, as a rule, be superfluous to take special measures to keep the covering layer in its correct position. If desired the covering layer can be glued to the supporting layer, or the covering layer can be fixed beneath a light frame which is connected to the frame plate by small screws. It is also obvious that the supporting layer need not be located with respect to the system with high magnetic permeability by means of projections fitting into openings in the latter system. It would be possible to mount this layer within protruding rims of the frame plate or of the system having high magnetic permeability. Moreover, this plate or system might be provided with projections fitting snugly into openings in the supporting layer and, if desired, also into openings in the covering layer and in the plate carrying the magnets, if such a plate is present. Moreover, the system having high magnetic permeability need not be a soft iron plate. An embodiment of a matrix according to the invention has been built in which this system consists of soft iron wires or strips which are embedded in the supporting layer provided with recesses. Furthermore, provided that it is nevertheless possible to maintain a sufficiently strong field in the cores to be made inoperative, it is not absolutely necessary that the matrix be provided with a system having high magnetic permeability. In this case, the only function of the frame plate is to reinforce the matrix so that it may be made of pertinax or plastics material.

What is claimed is:

1. A magnetic core storage apparatus comprising a plurality of magnetic storage cores arranged to form a matrix, a resilient support layer on one side of said core matrix and provided with recesses in which the cores of the matrix are supported, and wherein the resilient material of the support layer is impregnated with fine iron powder of an iron compound having a high magnetic permeability and a low magnetic remanence, a rigid soft iron plate adjacent to and supporting said layer and located at the side away from the recesses so that a thin layer of resilient material of said support layer is maintained between each core in its recess and said rigid plate, and means for inducing a magnetic flux in predetermined ones of said cores so as to disable said cores, said flux inducing means including at least one magnetic member mounted on the other side of said cores that is away from said support layer and contacting said predetermined cores to press said cores against said thin layer of resilient material, said thin layer of resilient material being deformable under the pressure of said cores so as to conform to the shape of the part of the core in contact therewith and being capable of resuming its original shape upon the removal of said pressure.

2. A magnetic core storage apparatus comprising a plurality of magnetic storage cores arranged to form a matrix, a resilient support layer on one side of said core matrix and provided with recesses in which the cores of the matrix are supported, a plurality of conductors threaded through said cores, a rigid soft iron plate adjacent to and supporting said layer and located at the side away from the recesses so that a thin layer of resilient material of said support layer is maintained between each core in its recess and said rigid plate, a covering layer located adjacent to and extending along the resilient support layer so that said conductors are located between said covering layer and said support layer, said covering layer having a plurality of openings therein in front of individual recesses in the support layer, the parts of the cores extending outside the recesses of said support layer being located at least for the greater part in said openings of the covering layer, and means for inducing a magnetic flux in predetermined ones of said cores so as to disable said cores, said flux inducing means including at least one magnetic member mounted on the other side of said cores that is away from said support layer and contacting said predetermined cores to press said cores against said thin layer of resilient material, said thin layer of resilient material being deformable under the pressure of said cores so as to conform to the shape of the part of the core in contact therewith and being capable of resuming its original shape upon the removal of said pressure.

3. A magnetic storage device comprising a support layer of resilient material having a plurality of recesses therein in a matrix, said resilient material being deformable under applied pressure so as to conform to the shape of the pressure applying element, a rigid support plate parallel with said layer and adjacent said layer on the side thereof away from the recesses, a plurality of magnetic cores mounted in said recesses to form a plane matrix, conductor means linking said cores, and means for recording information in said device by disabling selected ones of said plurality of cores, said disabling means including permanent magnet means arranged to apply a magnetic field to said selected cores at a level to substantially saturate said cores, and said permanent magnet means comprises, a pair of transversely magnetized permanent bar magnets positioned adjacent two opposite edges of said rigid support plate, and a plurality of notched bars of high magnetic permeability mounted in rows on the side of said cores that is away from said support plate and between said pair of bar magnets in alignment with said cores and containing teeth arranged in a pattern corresponding to the selected cores, the ends of said teeth abutting the selected cores in compressive contact therewith.

4. A magnetic storage device comprising a support layer of resilient material having a plurality of recesses therein in a matrix, said resilient material being deformable under applied pressure so as to conform to the shape of the pressure applying element, rigid support means adjacent said layer on the side thereof away from the recesses, a plurality of magnetic cores mounted in said recesses to form a plane matrix, conductor means linking said cores, a second layer of resilient material having openings therein in a matrix pattern corresponding to the matrix of said resilient support layer, said second layer being mounted adjacent said support layer to sandwich the support layer between the rigid support means and the second layer with said openings and recesses aligned so that the cores protrude into the openings of said second layer, and means for recording information in said device by disabling selected ones of said plurality of cores, said disabling means including permanent magnet means arranged to apply a magnetic field to said selected cores at a level to substantially saturate said cores, said magnet means including at least one magnetic member mounted on the side of said cores that is away from said support plate and in compressive contact with said selected cores.

5. A magnetic storage device comprising a support layer of resilient material having a plurality of recesses therein in a matrix, said resilient material being deformable under applied pressure so as to conform to the shape of the pressure applying element, rigid support means adjacent said layer on the side thereof away from the recesses, a plurality of magnetic cores mounted in said recesses to form a plane matrix, conductor means linking said cores, and means for recording information in said device by disabling selected ones of said plurality of cores, said disabling means including permanent magnet means arranged to apply a magnetic field to said selected cores at a level to substantially saturate said cores, said magnet means including at least one magnetic member mounted on the side of said cores that is away from said support plate and in compressive contact with said selected cores, and said support means comprises a rigid support plate parallel with said layer and composed of a magnetically permeable material and said permanent magnet means comprises, first and second soft iron bars mounted in parallel adjacent opposite edges of said rigid support plate, first and second permanent bar magnets mounted on said first and second iron bars, respectively, with their axes parallel and being magnetized transversely to said support plate, third and fourth soft iron bars mounted on said first and second bar magnets, respectively, and having notches therein aligned with individual rows of said cores, and a plurality of notched bars composed of a magnetically permeable material and mounted between said third and fourth bars and supported in the notches of said third and fourth bars, said plurality of bars being in alignment with said cores and containing teeth arranged in a pattern corresponding to the selected cores, the ends of said teeth being in close proximity to the selected cores.

6. A magnetic storage device comprising a support layer of resilient material having a plurality of recesses therein in a matrix, said resilient material being deformable under applied pressure so as to conform to the shape of the pressure applying element, said resilient support layer comprising a layer of flexible plastic material impregnated with fine particles of a magnetically permeable material, rigid support means adjacent said layer on the side thereof away from the recesses, a plurality of magnetic cores mounted in said recesses to form a plane matrix, conductor means linking said cores, and means for recording information in said device by disabling selected ones of said plurality of cores, said disabling means including permanent magnet means arranged to apply a magnetic field to said selected cores at a level to substantially saturate said cores, said magnet means including at least one magnetic member mounted on the side of said cores that is away from said support plate and in compressive contact with said selected cores.

7. A magnetic core storage apparatus as claimed in claim 6 wherein said resilient support layer is composed of silicone rubber.

* * * * *

PO-1050
(5/69)

UNITED STATES PATENT OFFICE
CERTIFICATE OF CORRECTION

Patent No. 3,696,345 Dated October 3, 1972

Inventor(s) GERHARDUS BERNARDUS VISSCHEDIJK

It is certified that error appears in the above-identified patent and that said Letters Patent are hereby corrected as shown below:

IN THE TITLE PAGE

Between "Inventor" and "Filed" insert as follows:

Assignee: N.V. Hollandse Signaalapparaten --;

Signed and sealed this 27th day of November 1973.

(SEAL)
Attest:

EDWARD M. FLETCHER, JR.
Attesting Officer

RENE D. TEGTMEYER
Acting Commissioner of Patents